(No Model.)
J. HEANEY.
MACHINE FOR BREAKING AND CLEANING HEMP.
No. 458,318. Patented Aug. 25, 1891.
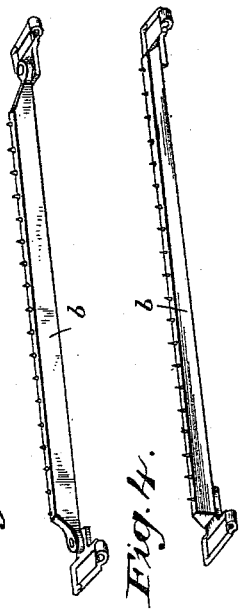
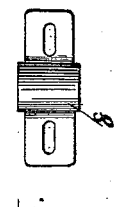
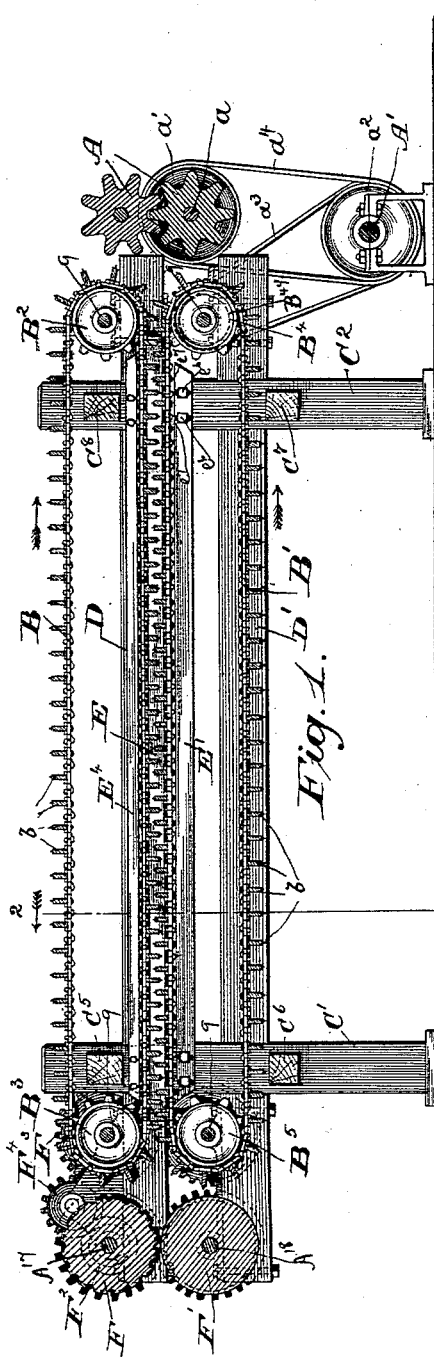
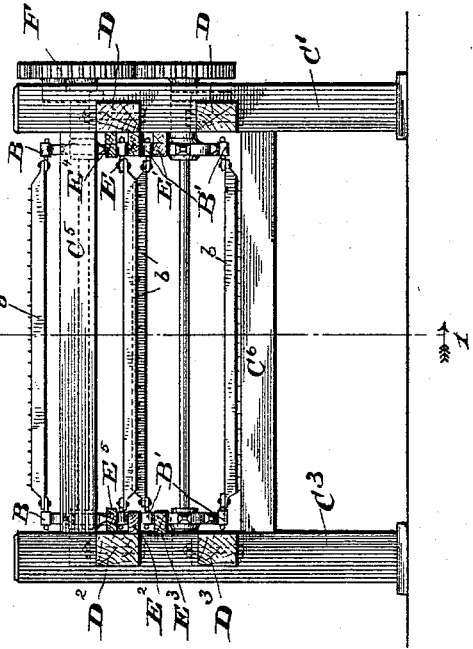
Witnesses.
Arthur Johnson
John F. Steward
Inventor.
John Heaney

UNITED STATES PATENT OFFICE.

JOHN HEANEY, OF BUCKLEY, ILLINOIS.

MACHINE FOR BREAKING AND CLEANING HEMP.

SPECIFICATION forming part of Letters Patent No. 458,318, dated August 25, 1891.

Application filed June 21, 1890. Serial No. 356,303. (No model.)

*To all whom it may concern:*

Be it known that I, JOHN HEANEY, of Buckley, in the county of Iroquois and State of Illinois, have invented certain new and useful Improvements in Machines for Breaking and Cleaning Hemp and other Fibrous Plants, of which the following is a full description, reference being had to the accompanying drawings, in which—

Figure 1 is a side elevation of my machine as if cut on the line 1 1 of Fig. 2; Fig. 2, an end sectional view of the machine as cut on the line 2 2 of Fig. 1. Figs. 3, 4, and 5 are details.

In the drawings, A represents the rollers of any ordinary roller hemp-brake; but instead of the rollers reciprocating beaters, or, in fact, any form of machine which serves to break the stalk, may be used for breaking. It is but necessary that the rollers A or some equivalent device move the broken stalks along at a given rate of speed.

In this specification and in the claims I shall consider the rollers A as being one of any of the well-known brakes, and in the claims consider as one element of certain of the combinations the rollers or any well-known equivalent whereby the stalks are broken and fed along.

B and B' are chains thrown over the sprocket-wheels $B^2$, $B^3$, $B^4$, and $B^5$. These sprocket-wheels are upon shafts 9, supported in suitable bearings 8, as shown in dotted lines in Figs. 1 and 2 and shown in detail in Fig. 5. They are mounted upon frame-works consisting of posts C', $C^2$, and $C^3$. Connecting these posts are the short beams $C^5$, $C^6$, $C^7$, and $C^8$, and connecting the frames thus constructed are the beams D, D', $D^2$, and $D^3$. The chains are made of considerable length between the sprocket-wheels which drive them and are held in position by guides E, E', $E^2$, $E^3$, $E^4$, and $E^5$. These two chains are provided with the cross-bars $b$ and are so placed that the said bars shall intermesh, as shown in Fig. 1. The bars are of such proportions as to thickness that there shall be spaces between them, as will also be seen in Fig. 1, and their depth may be such that they will intermesh more or less, as required.

Upon the shaft of the wheel $B^4$ is a pulley $B^{44}$, and upon the shaft $a$ of the hemp-brake is the pulley $a'$. Upon the counter-shaft A' is a pulley $a^2$, around which and the two pulleys before mentioned are thrown the belts $a^3$ and $a^4$. The pulley on the shaft of the sprocket-wheel $B^4$ is smaller than the pulley $a'$. I prefer to make the difference in size about two to one, so that the chain driven by the sprocket-wheel $B^4$ shall have a surface movement greater than the feeding movement of the brake in passing the stalks onward.

The comparative rates of speed of the feeding device of the brake and surface movement of the chain may need variation in operating upon different fibers. Hence I do not limit myself to any particular rate of speed, only that the surface movement of the chains shall be greater than the rate at which the stalks are fed to it.

The bars E' and $E^3$ are secured to the posts by bolts $e^6$, passing through slotted holes $e^7$, and may be raised or lowered to adjust the chains, so that the slats will intermesh more or less, as required for various fibers. The hemp-breaking device used in connection with the chain, one form of which is represented by the rollers A, must be competent to hold the stalks from being drawn forward by the action of the slats, and it will be readily understood that if stalks are passing through the rollers they will be moved at a certain rate and that if the chains having the bars move at a greater rate of speed the stalk and fiber once entering will be combed, and while being combed will be advanced as fast as the holding-rollers will allow. The bars of the chains intermeshing, the fibers being acted upon will be scraped and the shives gradually worked out and permitted to fall away.

In order to render the action of the bars $b$ more efficient, they may be provided with pins, as best shown in Figs. 3 and 4. These will have a combing action. When the ends of the stalks have once passed beyond the rollers A, they (the stalks) will be carried onward by the slats and such length of the fiber of any of the stalks not acted upon by the bars at the time that the hold upon the ends was released by the rollers will not be combed while passing through the chains but for the fact that I provide rollers F and F', suitably mounted upon the frame and geared to run at a higher rate of surface speed than the chains. These rollers are upon shafts $A^{17}$ $A^{18}$, supported on the main frame, and are geared by the pinion $F^2$, the gear $F^3$ on the chain-shaft $B^3$, and the intermediate $F^4$. The proportions of this gearing is shown to be such as to give the rollers F and F' a surface speed about double that of the movements of the chains; but this may be varied to any extent required by the various lengths of fibers and by fibers weak or strong, as the case may be. The action of the rollers F and F', moving as they do at a higher rate of speed, is to draw any fibers which they may seize forward, and hence through the intermeshing bearings upon the chains. To make the action of these chains clear, let us suppose that ten inches of the butt or head end of the stalks would extend between the receiving end of the feeding-chains and the breaking-rollers which release them. The entire length of the stalk would thus be subjected to a combing action of the bars of the chain, except the ten inches which we have supposed to extend from chains to rollers when released. So released, the stalks will pass forward at the full rate of speed which the chains move, and there will be no combing action upon the ten inches of stalk before mentioned until the fibers are seized by the rollers F and F', when the said fibers will be moved forward at a slightly greater rate of speed and a combing action will be produced by drawing them faster than the bars move, and this action will have the same effect in scraping and moving the shives away from the fibers as that with the stalks when still held by the rollers A from moving as rapidly as the chains at the beginning of the operation upon the said stalks.

I have made the bars E' and $E^3$ adjustable by slotting the holes through which pass the bolts which secure them to the posts. By this means they may be so adjusted as to guide the chains and hold them, so as to cause the slats to intermesh more or less, as required.

What I claim as my invention, and desire to secure by Letters Patent, is—

1. The feeding device, as the rollers A, the chains B and B', armed with slats, and the rollers F and F', the latter moved at a higher rate of surface speed than the chains by suitable means, as the intermediate pulley and belt devices and the gearing at the respective ends, all combined substantially as described.

2. The combination of a feeding device, as the rollers A, with the chains provided with the intermeshing slats, said chains sustained upon guides which are vertically adjustable, so that the depths to which the slats intermesh may be adjusted, substantially as described.

JOHN HEANEY.

Witnesses:
JOHN A. KOPLIN,
J. D. RIGGS.